United States Patent [19]

Müller et al.

[11] Patent Number: 4,729,863

[45] Date of Patent: Mar. 8, 1988

[54] PROCESS AND MOLDING TOOL FOR THE MANUFACTURE OF MOLDED PARTS HAVING AREAS IN THE FORM OF GRIDS, GRILLS OR GRATINGS, SUCH AS MOTOR VEHICLE SOFT-FACES, SPOILERS, BUMPERS FROM A FLUID MASS

[75] Inventors: Heinz Müller; Klaus Schulte, both of Leverkusen; Lothar Klier, Leichlingen, all of Fed. Rep. of Germany

[73] Assignee: Bayer Aktiengesellschaft, Bayerwerk, Fed. Rep. of Germany

[21] Appl. No.: 734,711

[22] Filed: May 16, 1985

[30] Foreign Application Priority Data

May 26, 1984 [DE] Fed. Rep. of Germany ....... 3419824

[51] Int. Cl.⁴ .................. B29C 45/56; B29C 67/22; C08G 18/08; C08G 18/14
[52] U.S. Cl. .................. 264/318; 264/51; 264/328.6; 264/328.7; 264/328.12; 264/DIG. 83; 425/543; 425/577; 425/817 R; 425/DIG. 14
[58] Field of Search ............ 264/DIG. 83, 328.6, 264/328.7, 328.12, 318; 425/DIG. 14, 577, 817 R, 543

[56] References Cited

U.S. PATENT DOCUMENTS

| | | | |
|---|---|---|---|
| 2,890,487 | 6/1959 | Morin | 425/577 X |
| 3,509,603 | 5/1970 | Halsall et al. | 425/577 |
| 3,564,660 | 2/1971 | Darnell | 425/577 X |
| 3,685,933 | 8/1972 | Schneider | 425/577 X |
| 3,709,640 | 1/1973 | Boden et al. | 425/4 R |
| 3,767,742 | 10/1973 | Robin | 264/DIG. 83 |
| 3,930,780 | 1/1976 | Lovejoy | 425/577 X |
| 3,970,732 | 7/1976 | Slaats et al. | 264/DIG. 83 |
| 4,129,636 | 12/1978 | Boden et al. | 264/DIG. 83 |
| 4,154,784 | 5/1979 | Ruhl | 264/DIG. 83 |
| 4,514,356 | 4/1985 | Harrison | 264/328.12 |

Primary Examiner—Philip Anderson
Attorney, Agent, or Firm—Gene Harsh; Joseph C. Gil; Aron Preis

[57] ABSTRACT

The present invention is directed to a process for the manufacture of molded parts having areas in the form of grids, grills or gratings, in which a fluid mass is introduced into the mold cavity of a molding tool conforming to the molded part and the cavity is filled by said fluid mass, characterized in that in the mold cavity, the zones provided for the apertures in the areas conforming to the said grids, grills or gratings of the molded part are first flooded by the mass and the mass is subsequently displaced from these zones, and to a molding tool to be used in such process.

5 Claims, 3 Drawing Figures

FIG. I

PROCESS AND MOLDING TOOL FOR THE MANUFACTURE OF MOLDED PARTS HAVING AREAS IN THE FORM OF GRIDS, GRILLS OR GRATINGS, SUCH AS MOTOR VEHICLE SOFT-FACES, SPOILERS, BUMPERS FROM A FLUID MASS

BACKGROUND OF THE INVENTION

The present invention relates to a process and a molding tool for the manufacture of molded parts having areas in the form of grids, grills or gratings (such as motor vehicle soft-faces, spoilers or bumpers) in which a fluid mass, and in particular a reaction mixture of reactive, fluid components is introduced into the cavity of a molding tool conforming to the molded part and fills this cavity.

Progressively more rapidly hardening systems, such as in particular those obtainable with polyurethane reaction mixtures are being adopted nowadays with a view to shortening the molding cycle. Thus, for example, when producing external parts for motor vehicles, such as front and rear spoilers, the cavities of molding tools must be filled within less than 2 seconds. This has led to the rule that in an area in the form of a grid, the reaction mixture always flows through along the ribs. Due to the asymmetric position of the sprue, however, this makes the flow paths unacceptably long and the density distribution in the molded part uneven. If the sprue is placed symmetrically, air inclusions are unavoidable due to the confluence of fluid which then occurs. Even in injection molding processes using conventional thermoplastics, difficulties in the form of air inclusions resulting from confluences occur when filling mold cavities due to the progressively more complicated forms of moldings.

The problem therefore arises of finding a process and a molding tool of the type indicated above in which air inclusions are avoided in the manufacture of the molded parts.

DESCRIPTION OF THE INVENTION

Figure 1:
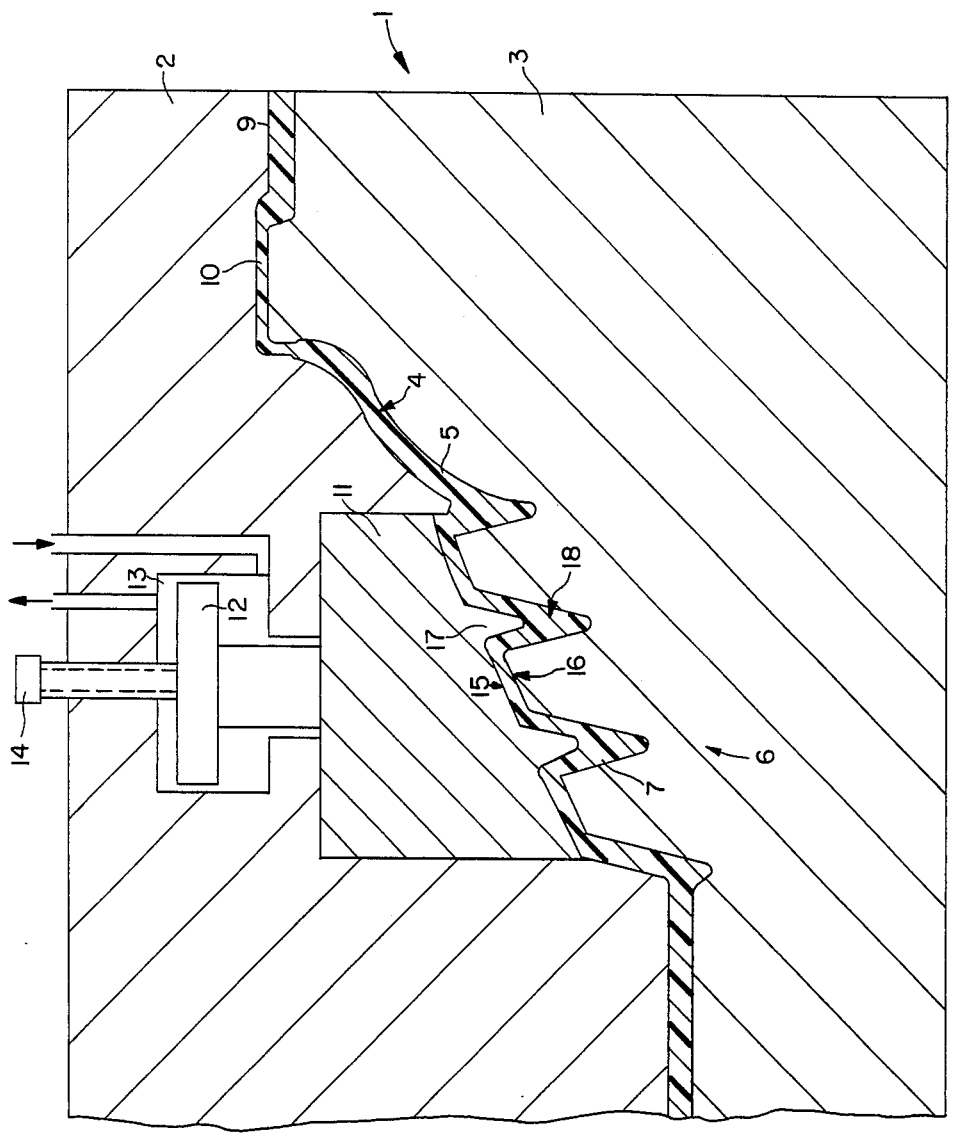
FIG. 1 is a schematic cross-section through the closed molding tool with the plunger in the filling position.
Figure 2:
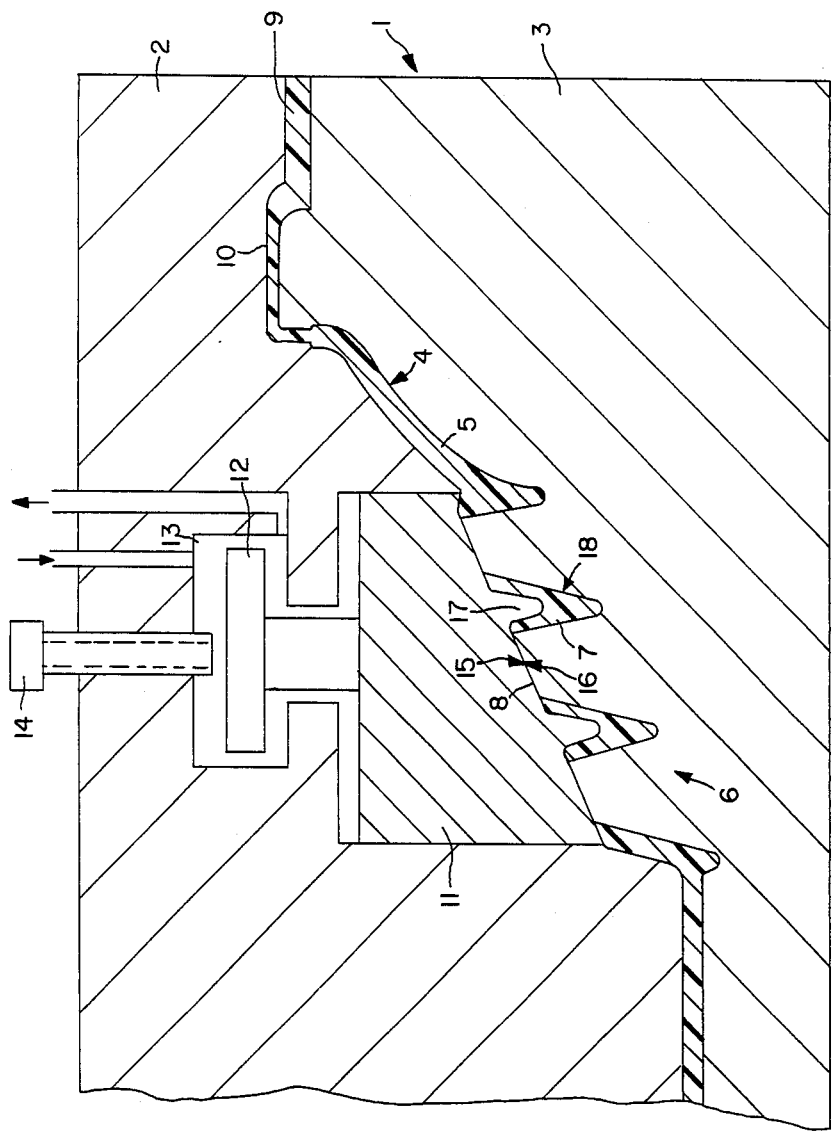
FIG. 2 is a schematic representation of the molding tool according to FIG. 1 but with the plunger in the end position towards the end of the mold filling process.

According to the present invention, the problem is solved by first allowing the mass to flood the zones in the mold cavity which are provided for the apertures in the grid or grating areas of the molded product and subsequently displacing the mass from these zones in the course of the process or after completion of the filling process.

By this method, a completely closed flow front moving forward at a relatively low speed is obtained so that no air inclusions are possible. It is only towards the end of the filling process that the mass is displaced from the zones provided for the apertures. The speed of displacement must be selected so that when the mass is being displaced, the flow front of the mass progresses so slowly that complete filling of the mold cavity without any air inclusions is possible.

The stream of the mass in the mold cavity is advantageously directed by deflecting elements into the recesses corresponding to the deepest parts of the ribs. In this manner, the flow path is controlled. At the same time, the deflecting elements in the form of lips or beadings determine the wall thickness of the ribs.

The new molding tool for the manufacture of molded parts having areas in the form of grids, grills or gratings (such as motor vehicle soft-faces, spoilers, bumpers) is based on a mold cavity conforming to the molded part which is to be produced, the two halves of the molding tool having contact surfaces in those zones of the said areas where the molded part is to have apertures.

The novelty resides in the fact that in one of the halves of the molding tool at least part of the contact surfaces are arranged on a plunger which is movable in the direction towards the corresponding contact surfaces of the other half of the molding tool. This plunger takes up a withdrawn position at the beginning of the mold filling process, in which position the contact surfaces are separated from one another. The plunger subsequently takes up a position in which the contact surfaces lie in contact with each other.

Due to this construction, the streams of material need not shoot at high speed through the narrow recesses of the transverse connections but instead, the contact surfaces may be flooded between the recesses, so that a much lower flow velocity is obtained and confluences are avoided. The air in the mold cavity can easily escape. The plunger may advantageously be operated hydraulically by a double action piston, but it may also be operated pneumatically or mechanically. The height of its stroke may optionally be adjustable by means of an adjustable stop. The velocity of feed of the plunger is advantageously controllable in order to avoid excessively high flow velocities during displacement of the mass from the zones between the contact surfaces into the remainder of the mold cavity.

According to one particular embodiment, deflecting elements provided between the contact, surfaces of the plunger extend into recesses corresponding to the deepest parts arranged in the other half of the molding tool to correspond to the ribs of the molded part. Such deflecting elements in the form of lips or beadings influence the direction of flow. These deflecting elements at the same time determine the form and wall thickness of the aforesaid ribs of the molded part.

A new molding tool for the manufacture of a soft-face having an area in the form of a grid is illustrated purely schematically in the drawing, by way of example, and described in more detail below.

The molding tool 1 consists of an upper mold half 2 and a lower half 3. The two mold halves 2,3 between them enclose a mold cavity 4 which constitutes the negative of a soft-face 5 for a motor vehicle. This soft-face 5 has a grid area 6 in which apertures 8 are arranged between ribs 7. A sprue channel 9 widens out into a sheet sprue 10 opening into the mold cavity 4. A plunger 11 (its contour is indicated by the dash-dot line in FIG. 3) which is movable towards the lower half 3 of the molding tool and can be operated by means of a double action hydraulic piston 12 is situated in the upper half 2 of the molding tool. The said piston 12 is guided in a hydraulic chamber 13. The stroke is adjusted to the desired height by means of an adjustable stop screw 14. The end face of the plunger 11 has contact surfaces 15 corresponding to the contact surfaces 16 of the half 3 of the molding tool. Deflecting elements 17 in the form of lips (indicated by dash-dot lines in FIG. 3) are arranged between the individual contact surfaces 15. Recesses 18 provided between the contact surfaces 16 constitute the negatives of the ribs 7. The deflecting elements 17 are directed into the recesses 18 and determine the wall thickness of the ribs 7 when the plunger 11 is in its end position. When the plunger 11 is withdrawn, the mass flows between the contact surfaces 15 and 16 (FIG. 1) and fills the recesses 18. When the filling process has progressed to an advanced stage, the plunger 11 is moved down, displacing the mass between the contact surfaces, so that the contact surfaces 15,16 are pressed together and the spaces 8 are formed. The flow front lines indicated in FIGS. 1 and 3 are intended to indicate the distribution of the reaction mixture, starting from the sheet sprue 10.

EXAMPLE

Figure 3:
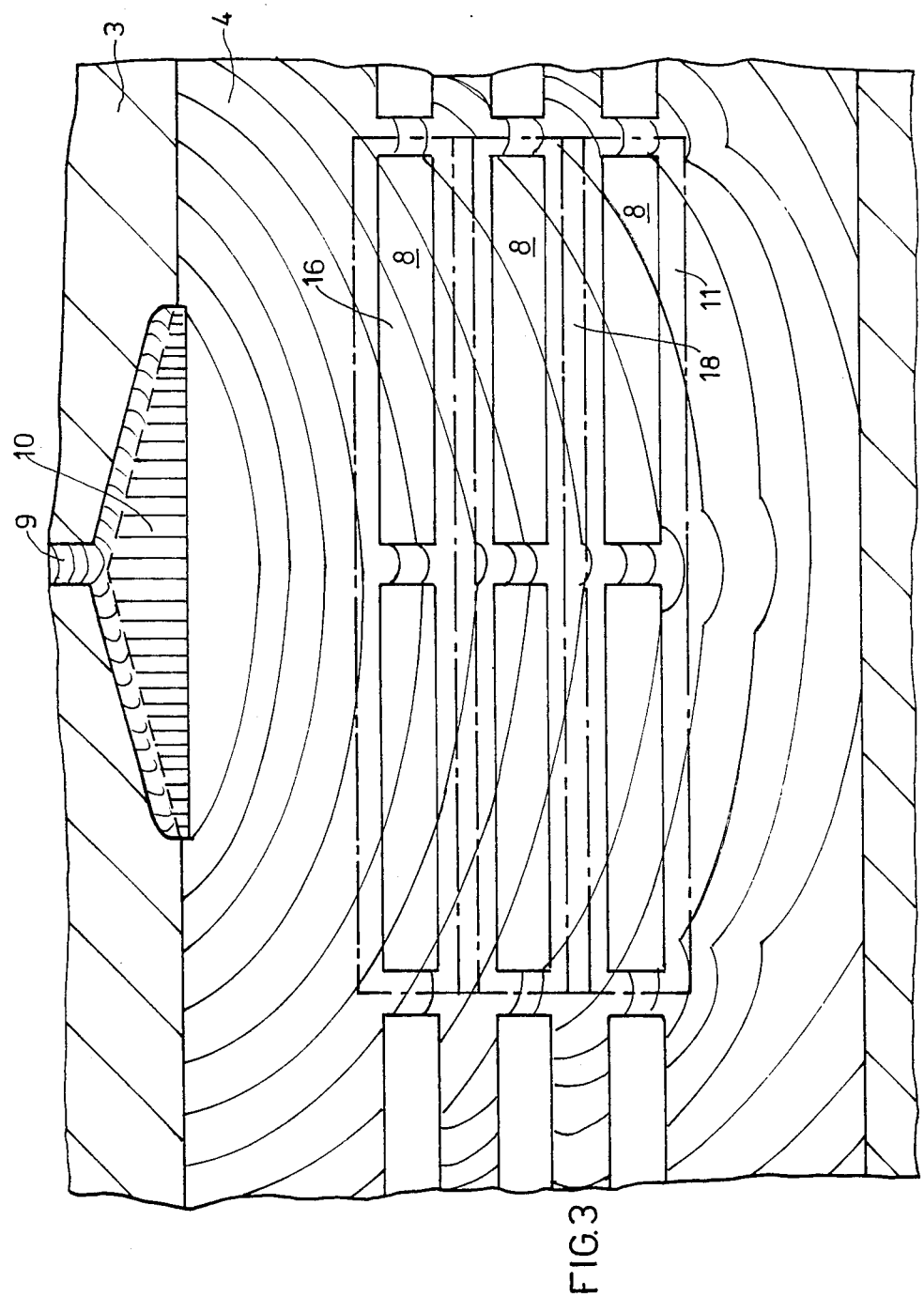
FIG. 3 is a plan view of the lower half of the molding tool.

The molding tool 1 according to FIGS. 1 and 3 is used. A reaction mixture forming a semi-rigid polyurethane foam is introduced into the mold cavity 4 which has a volume of 4000 cm$^3$. The filling time is 2.5 seconds. At the beginning of the mold filling process, the plunger 11 is withdrawn and the reaction mixture flows over the contact surfaces 16 and covers the deflecting elements 17. After 2.5 seconds, i.e. when the total quantity of reaction mixture required has been introduced, the supply of mixture is stopped and the plunger 11 is pressed against the lower mold half 3. The reaction mixture which has been displaced now fills the remaining part of the mold cavity 4 which has hitherto remained empty. After a hardening time of 60 seconds, the molding tool 1 may be opened and the molded part 5 removed. The molding tool 1 is then closed again, the plunger 11 is withdrawn and a fresh mold filling process may be started. Alternatively, the plunger 11 may be pressed towards the lower mold half 3 after 2.3 seconds, while mixture is still being introduced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the manufacture of molded parts having apertures in the form of grids, grills or gratings comprising (i) introducing a fluid mass selected from the group consisting of thermoplastics and polyurethane reaction mixtures into the mold cavity of a molding tool conforming to the molded part, said mold cavity being characterized in having zones conforming to said apertures, (ii) filling the mold cavity with said fluid mass including flooding said zones and (iii) displacing said fluid mass from said zones.

2. The process of claim 1 wherein said fluid mass is introduced as a stream which is directed by deflecting elements into recesses corresponding to the deepest parts of the ribs of said grids, grills, or gratings.

3. A molding tool for the manufacture of molded parts having areas in the form of grids, grills or gratings comprising (i) two halves of said molding tool, (ii) a mold cavity corresponding to a molded part which is to be produced (iii) contact surfaces between said two halves in zones corresponding to said areas where said molded part is to have apertures, said mold characterized in that in one of said halves at least part of said contact surfaces is arranged on a plunger which is movable in the direction of corresponding contact surface of the other mold half, said plunger being adapted to take up a withdrawn position at the beginning of the mold filling process in which position the contact surfaces are spaced apart and said plunger being further adapted to later take up a position in which contact surfaces are in contact one with the other.

4. The molding tool of claim 3, characterized in that deflecting elements are provided between the contact surfaces of the plunger, which deflecting elements extend into recesses arranged on the other mold half and corresponding to the ribs of the molded part.

5. A process comprising (i) introducing a fluid mass selected from the group consisting of thermoplastic and polyurethane reaction mixtures into a molding tool for the manufacture of molded parts having areas in the form of grids, grills, or gratings which contains (a) two halves of said molding tool, (b) a mold cavity corresponding to a molded part which is to be produced, (c) contact surfaces between said two halves in zones corresponding to said areas where said molded part is to have apertures, said molding tool characterized in that in one of said halves at least part of said contact surfaces is arranged on a plunger which is movable in the direction of the corresponding contact surface of the other mold half, said plunger being adapted to take up a withdrawn position at the beginning of the mold filling process in which position the contact surfaces are spaced apart and said plunger being further adapted to later take up a position in which contact surfaces are in contact one with the other, (ii) filling the mold cavity with said fluid mass including flooding said zones and (iii) displacing said fluid mass from said zones.

* * * * *